(12) United States Patent
St. Clair et al.

(10) Patent No.: US 8,732,276 B2
(45) Date of Patent: May 20, 2014

(54) DATA GATHERING USING A MOBILE COMPUTING DEVICE

(75) Inventors: James St. Clair, Calgary (CA); Jon Watts, Okotoks (CA); Karl Schulze, Calgary (CA); Peter Johnson, Calgary (CA)

(73) Assignee: Spira Data Corp., Calgary, Alberta (CA)

( * ) Notice: Subject to any disclaimer, the term of this patent is extended or adjusted under 35 U.S.C. 154(b) by 119 days.

(21) Appl. No.: 13/250,108

(22) Filed: Sep. 30, 2011

(65) Prior Publication Data

US 2013/0086205 A1   Apr. 4, 2013

(51) Int. Cl.
*G06F 15/16* (2006.01)
*H04W 4/00* (2009.01)
*H04L 12/18* (2006.01)
*H04L 29/08* (2006.01)

(52) U.S. Cl.
CPC ............... *H04W 4/00* (2013.01); *H04L 12/189* (2013.01); *H04L 67/04* (2013.01); *H04L 67/22* (2013.01)
USPC ........................... 709/219; 709/203; 707/634

(58) Field of Classification Search
CPC ....... H04W 4/00; H04L 12/189; H04L 67/04; H04L 67/22
USPC .................. 709/201, 203, 217, 219; 707/634
See application file for complete search history.

(56) References Cited

U.S. PATENT DOCUMENTS

| | | | |
|---|---|---|---|
| 6,976,024 B1 * | 12/2005 | Chavez et al. | 1/1 |
| 8,386,168 B2 * | 2/2013 | Hao | 701/414 |
| 2011/0140909 A1 * | 6/2011 | Olson et al. | 340/870.02 |
| 2012/0089568 A1 * | 4/2012 | Manley et al. | 707/634 |

* cited by examiner

*Primary Examiner* — Viet Vu
(74) *Attorney, Agent, or Firm* — Brion Raffoul (57) ABSTRACT

Systems and methods for field data gathering and which provide flexible configuration options for a central office. The system, run from, mobile computing devices, provides a free-flowing data gathering experience while only requiring what the central office needs from the field. The central office can configure the system to accept different types of data by way of different data input means available to the mobile computing device. Only the data needed by the central office need be collected by the mobile device operator. The data format is defined by the central office and is uploaded to each of the relevant mobile computing devices for use by the operators. Once each data set has been collected by an operator, the data package with the data set is scheduled for transmission to the central office once a connection with the central office can be made.

12 Claims, 8 Drawing Sheets

DATA GATHERING USING A MOBILE COMPUTING DEVICE

TECHNICAL FIELD

The present invention relates to data structures. More particularly, the present invention relates to data structures and systems using such data structures for use in data gathering using a mobile computing device.

BACKGROUND OF THE INVENTION

Data gathering in the field is something that has been occurring for centuries. Scientists, technologists and other research personnel gather environmental data, scientific data, and other data points for their research. Workers gather data that is used by their head offices to generate orders, gather billing data, and other business related activities. While field data gathering is widespread, in quite a few cases, it can be quite tedious and, depending on the circumstances, confusing.

As an example, sales people who take down orders while out in the field may need to take multiple points of data, some of which may be required for the head office to process the order.

Taking down the relevant data on paper may require repeat visits to the customer, especially if all of the required information has not been obtained. Paper based order sheets, with specific areas requiring information, may be used but such measures are not environmentally friendly. As well, there is still no guarantee that the person in the field will gather the correct data even if using such order sheets.

Similar to the above, researchers out in the field usually need to gather multiple data points. As an example, a researcher may need to gather the ambient air temperature, the moisture content of the air, along with other data points. However, if the researcher is not fully briefed on a project, he or she may not gather data points that might, in the end, prove to be the most important data.

The boom in smart mobile devices may alleviate the pain of data gathering by providing the data gatherers in the field with applications that require the data gatherers to obtain specific data points. However, if the data requirements change, these applications generally need to be rewritten and retooled before they can be redeployed in the field. The time lag caused by the reprogramming and/or retooling may mean lost productivity or, at the very least, less than optimal productivity.

Based on the above, there is a need for systems and methods that alleviate, if not overcome the shortcomings of the prior art.

SUMMARY OF INVENTION

The present invention provides systems and methods for field data gathering and which provide flexible configuration options for a central office. The system, run from, mobile computing devices, provides a free-flowing data gathering experience while only requiring what the central office needs from the field. The central office can configure the system to accept different types of data by way of different data input means available to the mobile computing device. Only the data needed by the central office need be collected by the mobile device operator. The data collected is packaged into a data package having a data format that is tree structured. The data format is defined by the central office and is uploaded to each of the relevant mobile computing devices for use by the operators. Once each data set has been collected by an operator, the data package with the data set is scheduled for transmission to the central office once a connection with the central office can be made.

In a first aspect, the present invention provides a system for gathering data at a location remote from a central office, the system comprising:
- a data format receiver for receiving a data format from said central office;
- a data aggregator for aggregating data gathered by an operator into a data package having a format derived from said data format received from said central office, said data format comprising a plurality of data nodes having an internal tree structure, said tree structure comprising:
  - a root node, said root node determining a type for said data package;
  - a plurality of data nodes, at least one data node being nested from said root node;
- a plurality of data input modules for providing data to be entered into said data nodes, at least one of said data input modules entering data into a data node upon activation by said operator;
- a data transmitter for transmitting said data package to said central office;

wherein said system operates as part of a mobile computing device.

In a second aspect, the present invention provides a method for gathering data from a location remote from a central office, the method comprising:
a) receiving a data format for said data from said central office, said data format comprising a plurality of data nodes having an internal tree structure, said tree structure comprising:
  - a root node, said root node determining a type for said data package;
  - a plurality data nodes, at least one data node being nested from said root node;
b) creating one instance of said root node based on said data format;
c) populating at least one of said plurality of data nodes with data received from at least one data input module;
d) aggregating said data in said data nodes into a data package;
e) transmitting said data package to said central office.

BRIEF DESCRIPTION OF THE DRAWINGS

The embodiments of the present invention will now be described by reference to the following figures, in which identical reference numerals in different figures indicate identical elements and in which.

DETAILED DESCRIPTION OF THE INVENTION

Figure 1:
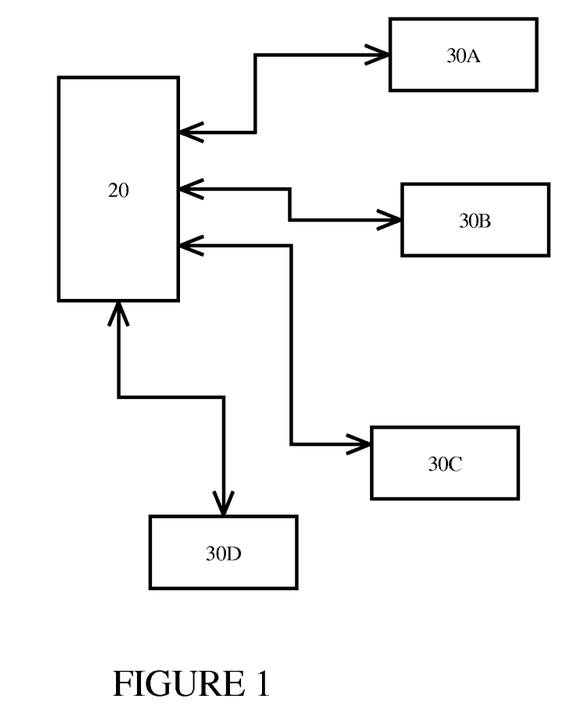
FIG. 1 is a block diagram of a communications system which may use the invention.

Referring to FIG. 1, a block diagram of a communications system 10 which may use the invention is illustrated. A central office 20 is in communication with multiple mobile computing devices 30A, 30B, 30C, 30D. Each mobile computing device is used by an operator who gathers data from areas remote from the central office. The data gathered is then uploaded to the central office when the operator is in communication with the central office. The communication links between the operator and the central office may be wireless, wired, or by way of a large network such as the Internet.

The mobile computing device may be a smartphone (e.g. an iPhone™, an Android handset), a tablet computer (e.g. an iPad™, a TouchPad™, or a Playbook™), a notebook, or any other computing device which may be taken into a non-office or non-laboratory environment and which is capable of data entry, data processing, and data transmissions.

The data gathered by the operator may be business, science, research, or technology-related. As an example, the operator may be a salesperson gathering data relating to an order being placed, with the data including the customer name, address, billing information, the goods or services being ordered, delivery option selected, etc. As another example, the operator may be a researcher gathering data relating to environmental conditions at a specific location. For this researcher example, the data may include not just the environmental conditions (e.g. temperature, humidity, rainfall, etc.) but also the location of the area (e.g. GPS coordinates, area name, address, etc.).

The central office, when in communication with a mobile computing device, can upload to the mobile computing device the data format it requires. This includes the data fields needed, which data points are required, which data points are optional, the maximum and minimum sizes of each data field, and how the data is to be entered into the various fields.

Figure 2:
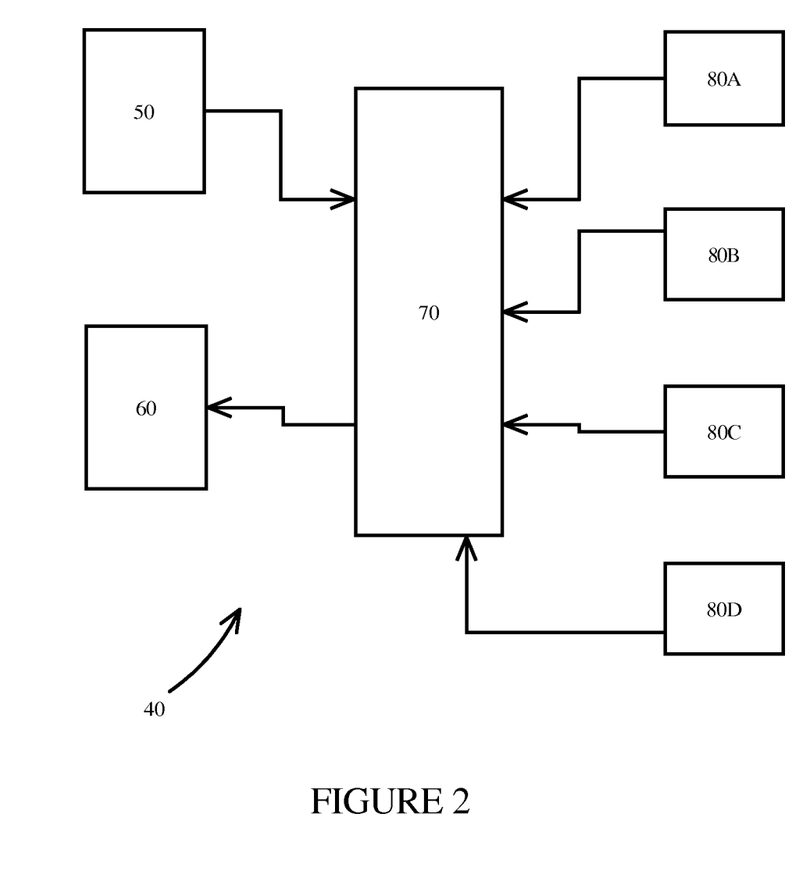
FIG. 2 is a block diagram of a data gathering system according to one aspect of the invention.

The data gathering system 40 according to one aspect of the invention is an application operating on a mobile computing device. A block diagram of such a system is illustrated in FIG. 2.

The system 40 has a data reception module 50, a data transmission module 60, and a data aggregator module 70. The system 40 also has data input modules 80A, 80B, 80C, 80D. The data reception module 50 is used to receive the data format from the central office. The data transmission module is used to transmit the data gathered to the central office when a communications link to the central office is available. The data aggregator module 70 aggregates the data gathered into a data package suitable for transmission to the central office. The data input modules each allow for the input (whether manual or automatic) of data into the data uploaded by the central office.

Figure 3:
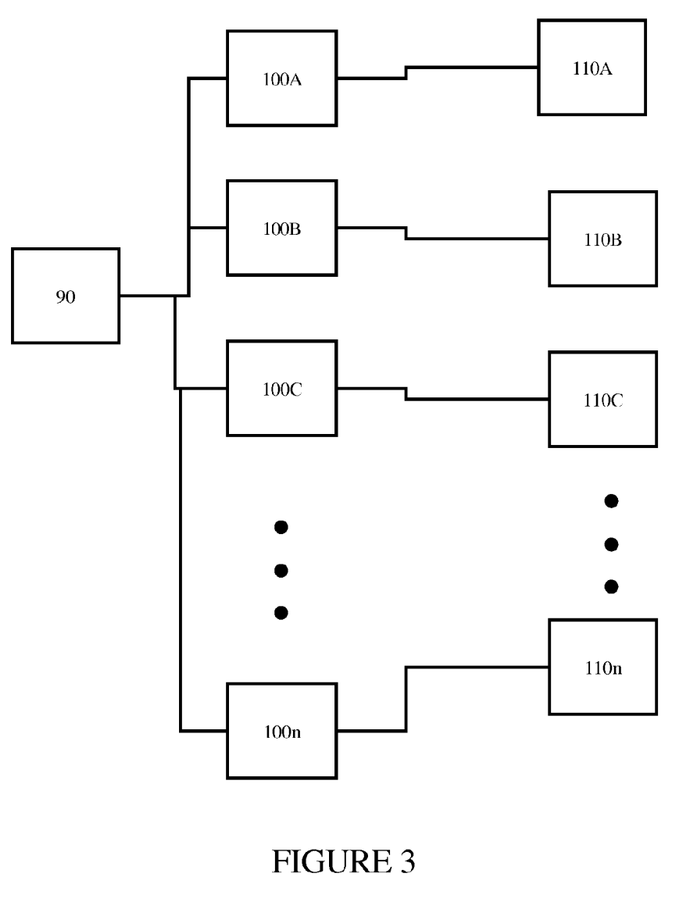
FIG. 3 is a block diagram of an internal tree structure of a data format according to one aspect of the invention.
Figure 3A:
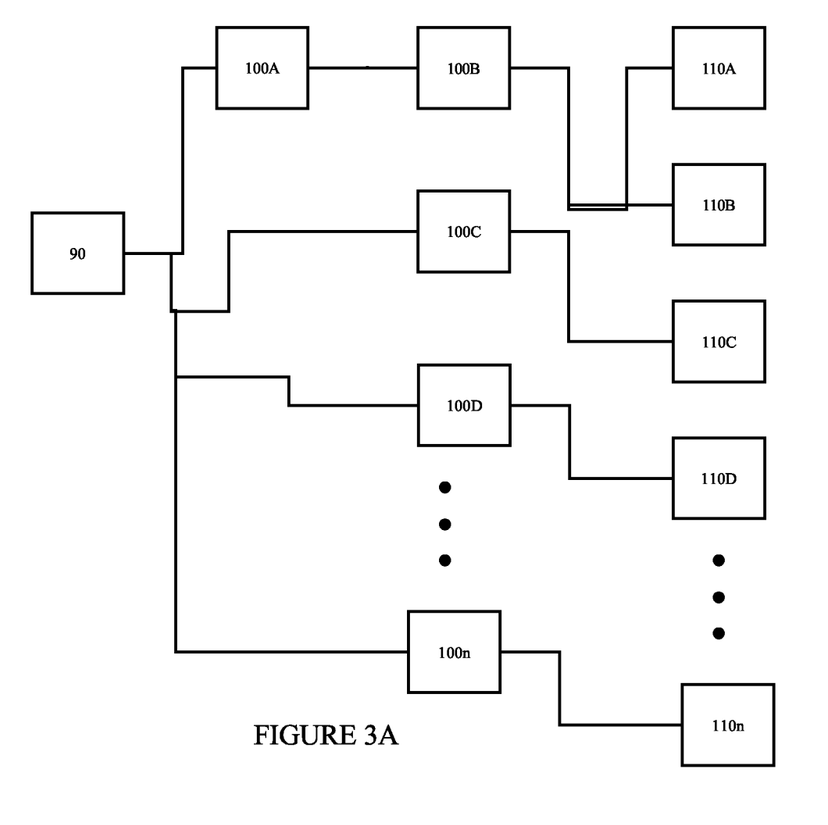
FIG. 3A is a block diagram of a sample internal tree structure of the data format of FIG. 3.

The data format uploaded from the central office and used by the system 40 has an internal tree structure and is therefore composed of data nodes with one root node (see FIG. 3). Within the tree structure, the root node 90 is the only node which does not have a parent node (i.e. it is not a child node). As can be seen from FIG. 3, the root node 90 is directly connected to a number of internal nodes 100A, 100B, 100C . . . 100n and end data nodes 110A, 110B, 110C, . . . , 110n are connected to these internal nodes. It should be noted that the order and structure of the internal data nodes are completely configurable and adjustable by the central office. (See FIG. 3A for an alternative tree structure as an example.)

These internal data nodes can be nested with each other and each data node can have multiple child nodes. It is possible for each data node to have multiple parent nodes. The end data nodes are the nodes that receive and store the actual data gathered from the field.

The internal nodes serve to classify or categorize the data that is finally stored. In one example, the data to be gathered relates to a customer order for hardware supplies. The root node may be of the classification ORDER (to denote that the data relates to an order). The first level child nodes may then be the various types of hardware goods available (e.g. tools, plumbing supplies, carpentry supplies, masonry supplies, etc.). The second level child nodes can the various subcategories of the types of hardware goods (e.g. for tools, the child nodes may be hammers, band saws, hacksaws, work benches, etc.). The third level child nodes could be the different brands for each of the subcategories while the fourth level child nodes could be the end data nodes which would contain the actual number of each item being ordered by the customer.

The data input modules are used to receive or retrieve the actual data to be saved in the end data nodes. A different data input module is used for each type of data to be received or retrieved. As an example, one data input module can be used to retrieve GPS coordinates from the GPS receiver in the mobile computing device. Similarly, another data input module is used to receive operator entered data from the keyboard on the mobile computing device. A third data input module may be used to retrieve data from the touch screen on the mobile computing device. Other data input modules may be used to retrieve data from other hardware or software implemented input devices on the mobile computing device. Data input devices which may be used with the invention can be handled by various software modules such as:

- text entry modules;
- numeric entry modules;
- location entry modules;
- photo picker modules;
- drawing based modules.

Figure 4A:
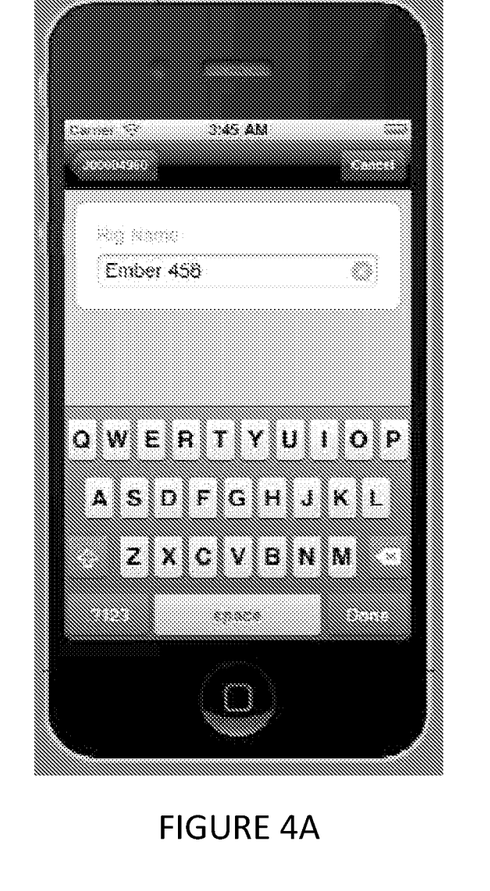
FIG. 4A is an illustration of a software keyboard on a mobile computing device.
Figure 4B:
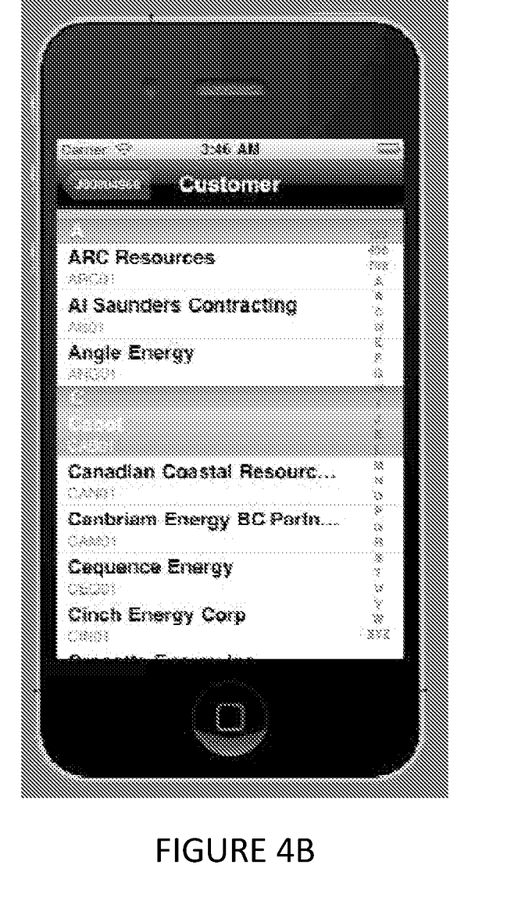
FIG. 4B is an illustration of a scrolling menu on a mobile computing device.
Figure 4C:
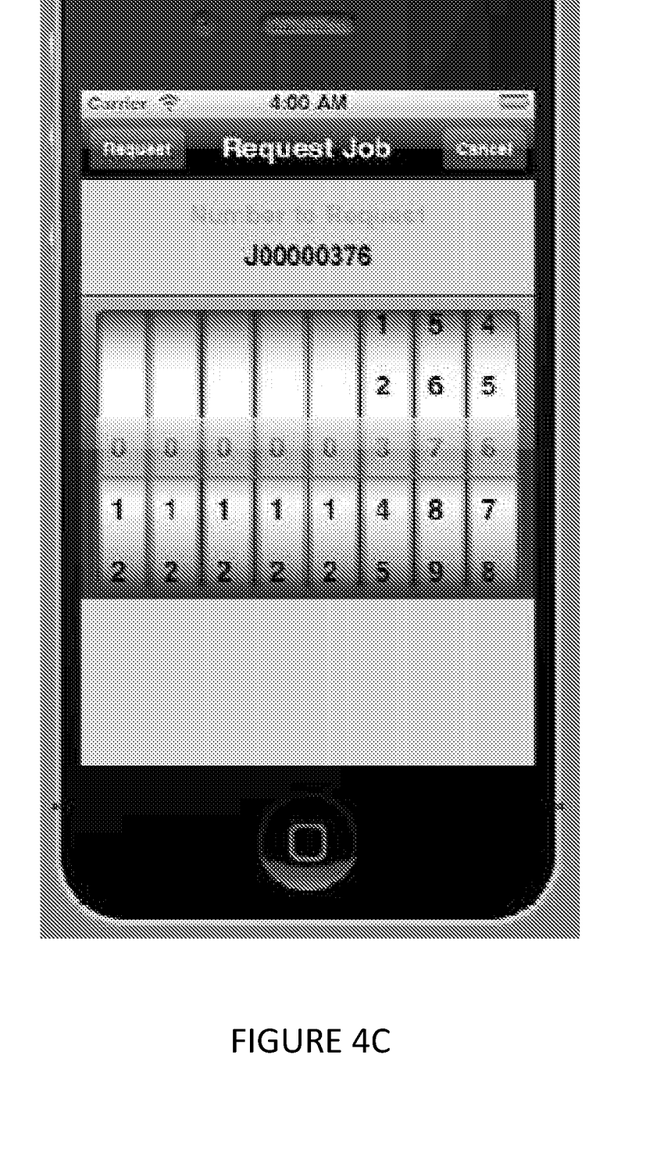
FIG. 4C is an illustration of a spinner menu on a mobile computing device.

Non-limiting examples of such data input devices (whether implemented as software or hardware) are:

- a software keyboard (see FIG. 4A for an example);
- a hardware keyboard;
- a scrolling menu (see FIG. 4B for an example);
- a spinner menu (see FIG. 4C for an example);
- a digital camera;
- a voice recording memory.

The mechanism used to input the data into the various end data nodes is predetermined by the data format from the central office. As an example, if an end data node is for storing a numeric value (e.g. a SKU (stock keeping unit) for a product), numerous options for data entry are available such as the software keyboard, a numerical spinner menu, or a hardware keyboard. The data format from the central office would dictate which data input means is used. Thus, operators would not have the option of selecting which data input means is used as the data format would only allow a selected data input method or means to be used by the end user or person in the field. In the numeric value example, the data format could dictate that operators are only provided with the software keyboard for entering the numeric value for storage in the end data node. As another example, the data format may dictate that operators can use a software representation of a dial for entering a value from 1-10 (or 11) if an end data node requires such a value.

The system operates by initially having the central office upload the data format to the various mobile computing devices. As can be imagined, different central offices, having different needs, will upload differently configured data formats to the mobile computing devices of their various operators.

Once the data format has been uploaded, the operator can then start gathering data from the field based on that data format. The operator initiates the process by essentially creating a new data node tree for each data set or group of data points. The group of data points is initiated by creating a new root node of a predefined type or classification. From the root node, the operator can then traverse the data node tree and enter data where necessary using whichever data input modules have been configured to be used for a specific input data node. As an example, the operator can initiate the data node tree with a root node. The root node's first child node may be a data input node where the operator is required to select a customer name from a selection of predefined customer names. Selecting a customer name then populates that data input node with the selected customer name. The next data node in the tree may then be another category that is a child node of the root node (e.g. job type). Multiple predefined options for this category may then be provided to the operator. Once a selection is made, the operator then continues populating the various input data nodes using the relevant data input modules.

It should be noted that some of the data nodes in the data node tree may be marked as being required. This means that the operator has to select/input data for that data node otherwise the process cannot be completed. Other data nodes may need data but, if they are not marked as being required, then the operator may leave such data nodes blank and the process may still continue and terminate successfully.

It should further be noted that the operator need not enter data sequentially or in any specific or predetermined order. As an example, after the root node is initialized, the operator may be presented with a menu of the first level child nodes of the root node. The operator can then select which child node (i.e. which branch) to traverse and thereby enter data for. In fact, depending on the configuration of the data format, there may be data nodes which are populated automatically once the root node has been initialized or once a specific child node has been accessed. In one example, if the data point to be gathered is the location of the mobile computing device (perhaps to determine a job site or the location for a research project), the system can automatically retrieve the GPS coordinates from the GPS receiver on the mobile computing device.

Once the relevant data nodes have been populated with data, the data set can be aggregated by the data aggregator into a data package for transmission to the central office. Preferably, the data package has all of the data gathered for that data set so that each data set can be uploaded to the central office as a self-contained package. Thus, in a customer order data gathering example, a data package would represent a single customer order containing not just the customer identification but the billing information, the shipping information, the identity of the goods or services being ordered, the quantity being ordered, as well as a desired delivery date.

Packaging the data collected into a data package may take a number of forms. In one embodiment, each data node tree is packaged as a whole data package and sent to the central office as a complete data node tree. For this embodiment, the complete data node tree, with the relevant end data nodes populated with data, is sent to the central office. In another embodiment, instead of packaging the whole data node tree, only the end data nodes, with the data populating them, are sent to the central office. The end data nodes, properly tagged as being specific end data nodes (e.g. quantity, temperature reading, etc.) and their associated data, is aggregated and then transmitted to the central office. Tagging the end data nodes may require that the end data nodes be tagged with a representation of the "genealogy" of the end data node. This means that the parentage of each end data node may need to be used in the tag so that data processing at the central office may be able to determine which type of data format or which branch of a specific data node tree is being referenced. As an example, if a central office data format for a data node tree for customer orders has 3 end data nodes called QUANTITY (e.g. one for hammers, one for nails, one for staples) an indication as to the parentage of a specific end data node would ensure that the correct data is stored and processed.

It should be noted that the system need not be limited to only one type of data being gathered. In the customer order data gathering example, an operator could create a new data node tree that is different from a customer order data node tree. The operator could create a new customer data node tree with a different type of root node. The operator could be given an option as to the different types of root nodes available and, by selecting one, the operator selects the type of data to be gathered for that particular data package. The different root node types would determine the type of data being gathered and the structure of the data node tree. As an example, a data package for customer orders would have a different internal tree structure and different data nodes from a data package for new customer information. Of course, all these different types of data packages and their data formats would need to be defined and provisioned for by the central office.

The system allows for multiple types of input data to be used to populate the input data nodes. As an example, an operator gathering customer orders can, to confirm the order, ask the customer for his or her signature. By using the touch screen of the mobile computing device, the customer can provide his signature and the digital image produced by the customer signing on the touch screen can be the data that populates one of the input data nodes. Similarly, if the data being gathered relates to a repair job, a digital picture(s) of the piece to be repaired may be used as data to populate the input data nodes. The digital picture can be retrieved from the digital camera on the mobile computing device by a suitable data input module.

The invention as described above allows the central office to define multiple different types of data node trees. The different data formats for these different types of data node trees are, as described above, uploaded to the devices of the various operators. The operators can then initiate any of the various types of data node trees as required in the field. In one embodiment of the invention, the central office can define a large number of subtrees, each of which can have end data nodes associated with a particular subtree. These various subtrees can then form part of a particular type of data node tree. As an example, a subtree may be defined with a title COMPONENT TEMPERATURE to denote that the subtree relates to a temperature reading of a specific component. This subtree, defined by the central office, can have 4 child nodes (TEMP READING, DATE, TIME, NOTES) each one being an end data node. These end data nodes can be populated by the operator entering the data required such as the actual temperature reading, the date the reading was taken, the time the reading was taken, and any notes the operator wishes to take regarding the reading. As noted above, these subtrees can be grafted on to a data node tree as required by the data format being defined by the central office. In one example, the central office can define a data format for a data node tree of type CHEMICAL PLANT READINGS. This type of data node tree, once initiated with a root node, can have, as children nodes of the root nodes, the various components of the chemical plant. Each component node can have grafted on to it the subtree COMPONENT TEMPERATURE. Instances of this subtree can thus form part of the resulting data node tree.

As can be seen from the above example, the central office can define as many subtrees as it needs (in whatever configuration) and use instances of these subtrees as building blocks or building components to define larger trees to result in the data format defining a specific type of data node tree. A central office can therefore define a specific type of data node tree by first defining a root node with a specific name or tag. The root node can have any number of child nodes and these child nodes can have their own child nodes. A predefined subtree can then be grafted on to any of the child node or, in fact, can be grafted on directly to the root node. The subtree itself can be composed of predefined subtrees. As can be imagined, the operator can initiate a specific type of data node tree by simply creating an instance of a data node tree defined by which type of root node is used. Following the example in the previous paragraph, by creating a root node of the tag CHEMICAL PLANT READINGS, the operator has created a data node tree that follows the data format of that particular type and, as such, this data node tree's structure will mirror the structure of the data format for that type of data node tree defined by the central office.

From the above, it should therefore be clear that the type of root node initiated will determine the data format used for a particular data node tree. From the above examples, the root node of classification or type ORDER will generate a data node tree with a structure as defined for that type of data node tree by the central office. This means that any data node tree of type or classification ORDER (for that particular organization) would have four levels of nodes and the nodes will relate to the various types of hardware goods available (first level), the various subcategories of the types of hardware goods (second level), the different brands for each of the subcategories (third level), and finally, end data nodes (fourth level) which would contain the actual number of each item being ordered by the customer.

It should be noted that, for each enterprise using the invention (i.e. each central office), the internal structure of the system described above is internally consistent. What this means is that, as an example, for a company using the invention to collect orders from customers, the various subtrees, end data nodes, root nodes, data formats, data tree types, etc. are all identical within the enterprise. Thus, all devices used by operators for that enterprise will be able to use the data format framework defined by that particular central office. That particular central office can thus define data formats A, B, and C using the various subtrees and end data nodes, root nodes, etc. that it previously defined and the various devices for its operators can access and use those data formats. A different central office for a different enterprise would NOT be able to use data formats A, B, or C as the internal data format framework for this different enterprise would be different. The concepts used to define the data format framework would be identical but the implementation (e.g. the tags, fields, data fields, which data input means are allowed, etc.) would be quite different. Thus, within one implementation or within one enterprise, the data structure framework would be internally consistent to allow those within that enterprise to access the data stored within that framework. As such, the data collected from the field by the mobile device operators employed by that enterprise would be accessible to those within the enterprise. Another enterprise, with another implementation, may, depending on the implementation, be unable to access the data from the first enterprise.

Figure 5:
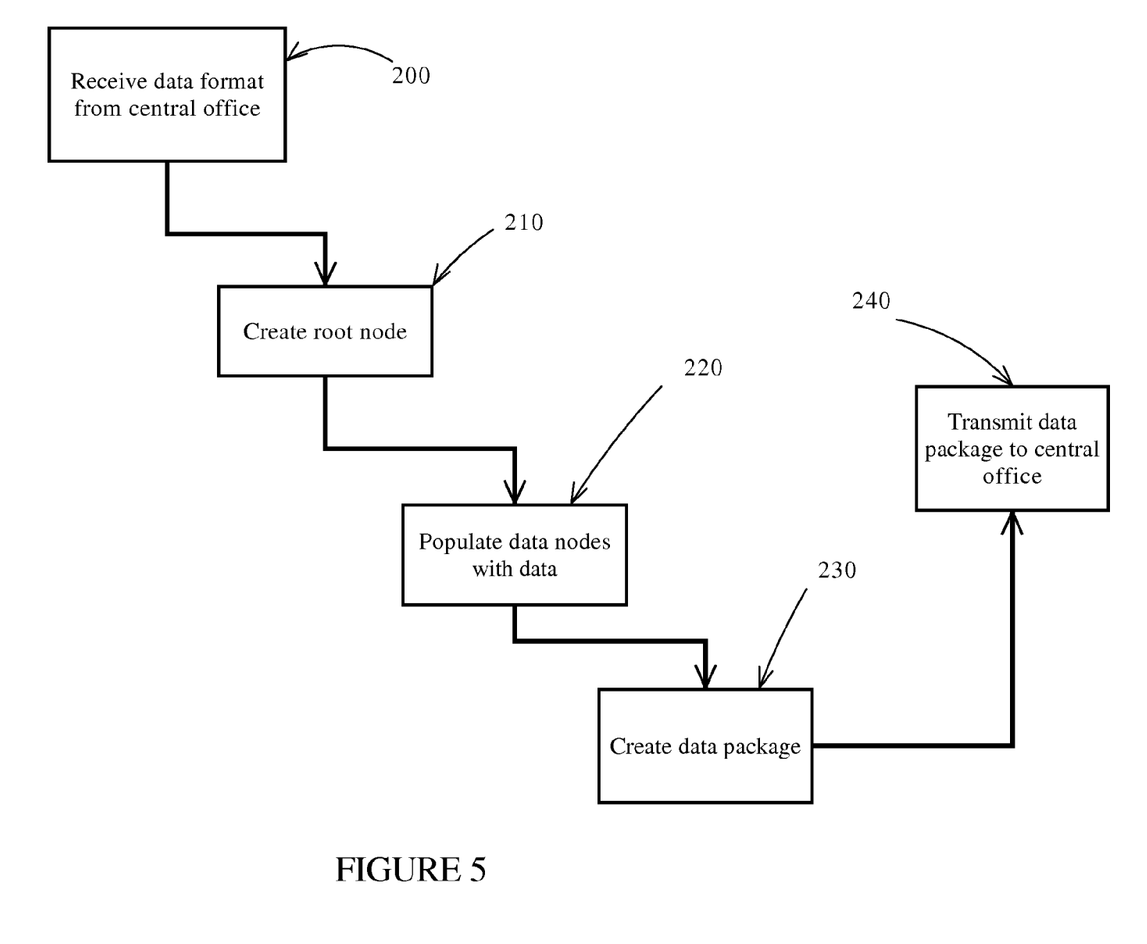
FIG. 5 is a flowchart detailing the steps in a method according to one embodiment of the invention.

The steps in a method according to one aspect of the invention may be summarized in a flowchart as illustrated in FIG. 5. The method, executed on a mobile computing device, begins in step 200—that of receiving a data format from a central office. Step 210 is that of creating one or more instances of a root node, with each root node being the root of a tree structure or directed graph. As noted above, each data tree follows the data format received from the central office. Data nodes are then created, each data node having a parentage that ultimately is traceable to that tree's root node. Step 220 is that of populating the relevant data nodes with data from data input modules. Once the data nodes have been populated, that data is then packaged into a data package (step 230) and then transmitted to the central office (step 240). It should be noted that steps 200 and 210 may be remote in time and that step 200 may only need to be executed whenever a new data format from the central office is available. As well, steps 230 and 240 may also be remote in time from one another as the data transmission need not occur until there is a data connection with the central office.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g. "C") or an object-oriented language (e.g. "C++", "java", or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above, all of which are intended to fall within the scope of the invention as defined in the claims that follow.

Having thus described the invention, what is claimed as new and secured by Letters Patent is:

1. A system for gathering data at a location remote from a central office, the system comprising:
    a data format receiver for receiving, by a processor, a data format from said central office only when a communications link exists between said system and said central office;
    a data aggregator for aggregating and storing, by said processor, data gathered by an operator of a mobile computing device into a complete self-contained data package having a format according to said data format received from said central office, said data format comprising a plurality of data nodes having an internal tree structure, said tree structure comprising:
        a root node initiated by said operator of said mobile computing device, said root node determining a type for said data package;
        a plurality of data nodes, at least one data node being nested from said root node;
    a plurality of data input modules for providing, by said processor, data to be entered into said data nodes, at least one of said plurality of said data input modules entering data into a data node upon activation by said operator, and
    a data transmitter for transmitting, by said processor, said data package to said central office only when said communications link exists;
    wherein
    said system operates as part of said mobile computing device,
    said data format determines which data input modules are to be activated by said operator for entering data into data nodes,
    said data being sent as a complete data node tree in said self-contained data package; and,
    nodes internal to said tree structure are used to classify data entered into said data nodes.

2. A system according to claim 1 wherein at least one of said plurality of data nodes are nested with other data nodes.

3. A system according to claim 1 wherein said plurality of data input devices includes at least one of:
    a hardware keyboard coupled to said mobile computing device;
    a software keyboard operatively coupled to said mobile computing device;
    a touchscreen;
    a software implemented scrolling menu with predefined entries;
    a software implemented multiple spinner menu;
    a digital camera;
    a location module for providing GPS coordinates of a location; and
    a voice recording.

4. A system according to claim 1 wherein said system uses different data package formats for different types of data gathered by said operator.

5. A system according to claim 1 wherein said mobile computing device is a mobile smartphone handset.

6. A system according to claim 1 wherein said mobile computing device is a tablet computer.

7. A method for gathering data from a location remote from a central office, the method comprising:
    a) receiving a data format for said data from said central office when a communications link exists between a mobile computing device and said central office, said data format comprising a plurality of data nodes having an internal tree structure, said tree structure comprising:
        a root node, said root node determining a type for said data package;
        a plurality of data nodes, at least one data node being nested from said root node;
    b) creating one instance of said root node based on said data format;
    c) populating at least one of said plurality of data nodes with data received from at least one of a plurality of data input modules, said root node being initiated by an operator of said mobile computing device;
    d) aggregating said data in said data nodes into a complete self-contained data package; and
    e) transmitting said data package to said central office only when said communications link exists;
    wherein
    said data format determines which data input modules are to be activated by said operator for entering data into said plurality of data nodes,
    said data input modules being part of said mobile computing device,
    said data being sent as a complete data node tree in said self-contained data package; and,
    nodes internal to said tree structure are used to classify data entered into said data nodes.

8. A method according to claim 7 wherein said method is executed on said mobile computing device.

9. A method according to claim 7 further including the steps of:
    f) repeating steps b)-d) for each instance of a data set gathered, each data set resulting in a data package such that each data package contains data for a complete data set.

10. A method according to claim 7 wherein said communications link is a wireless link.

11. A method according to claim 7 wherein said data package comprises data in said data nodes tagged with an identification of said data nodes to which they relate.

12. A method according to claim 7 wherein, for step c), said at least one data input module is defined in said data format.

* * * * *